United States Patent
Kraus

[11] Patent Number: 5,984,313
[45] Date of Patent: Nov. 16, 1999

[54] SLIDING RING SEAL

[75] Inventor: Reinhold Kraus, Mörlenbach, Germany

[73] Assignee: Firma Carl Freudenberg, Weinheim, Germany

[21] Appl. No.: 08/862,008

[22] Filed: May 22, 1997

[30] Foreign Application Priority Data

May 24, 1996 [DE] Germany ............ 196 20 950

[51] Int. Cl.$^6$ .................................................. F16J 15/34
[52] U.S. Cl. ..................... 277/396; 277/379; 277/382; 277/390
[58] Field of Search ...................... 277/375, 379, 277/382, 384, 390, 396; 285/348, 918

[56] References Cited

U.S. PATENT DOCUMENTS

| | | | |
|---|---|---|---|
| 2,503,086 | 4/1950 | Albright | 277/396 |
| 3,068,012 | 12/1962 | Van Vleet | 277/390 X |
| 3,430,990 | 3/1969 | Nelson | 285/348 X |
| 3,977,685 | 8/1976 | Greenawalt et al. | 277/379 |
| 4,183,541 | 1/1980 | Wentworth | 277/379 |
| 4,560,174 | 12/1985 | Bisi | 277/382 |
| 4,754,981 | 7/1988 | Burns | 277/375 X |
| 5,172,921 | 12/1992 | Stenlund | 277/300 |
| 5,560,622 | 10/1996 | Sedy | 277/379 |

Primary Examiner—Anthony Knight
Attorney, Agent, or Firm—Kenyon & Kenyon

[57] ABSTRACT

A sliding ring seal includes a counter ring and an adjusting ring configured as a buttress. The counter ring and the adjusting ring are interconnected in a manner that does not allow for relative rotation, and they enclose a shaft to be sealed, also in a manner that does not allow for relative rotation. At least one sealing ring made of an elastomeric material seals the counter ring and the adjusting ring with respect to each other and with respect to the shaft. A sliding ring is joined to a housing and is sealed with respect thereto by means of at least one further sealing ring. The sliding ring is joined to the housing in an axially resilient manner that also does not allow for relative rotation. The counter ring and the sealing ring respectively include sealing surfaces that contact one another sealingly under an elastic preload. The sealing rings are arranged, sealingly and under the elastic preload, in a corresponding installation space. One installation space is formed between the counter ring and adjusting ring, and the other installation space is formed between the sliding ring and the housing. Substantially the entire surface area of at least one of the sealing rings is contacted, under the elastic preload, by the delimiting walls of the corresponding installation space and by a support surface of at least one support element arranged in the corresponding installation space.

21 Claims, 2 Drawing Sheets

SLIDING RING SEAL

BACKGROUND OF THE INVENTION

The present invention is directed to a sliding ring seal and, in particular, to a sliding ring seal comprising a counter ring and an adjusting ring that are interconnected so that they do not move relative to one another. The counter ring and adjusting ring enclose a shaft that is to be sealed. The counter ring and the adjusting ring are sealed with respect to each other and to the shaft by at least a first sealing ring made of an elastomeric material. The sliding ring seal of the present invention also includes a sliding ring. The sliding ring is axially aligned with and resiliently jointed to a housing in such a way that no relative motion between the sliding ring and the housing occurs. The connection between the sliding ring and the housing is sealed by at least a second sealing ring. The counter ring and the sealing ring have sealing surfaces that contact one another in a sealing manner under an elastic preload. The first and second sealing rings are arranged in a corresponding installation space; the installation space corresponding to the at least first sealing ring is formed between the counter ring and the adjusting ring, and the installation space corresponding to the at least second sealing ring is formed between the sliding ring and the housing.

Typical sliding ring seals are made from permeable elastomeric materials. The sealing rings are intended to seal against a particular medium; if the pressure brought against the sealing rings by the medium becomes too great, the medium begins to penetrate the elastomeric material that constitutes the sealing rings. If a sudden pressure drop occurs in the surroundings of the sealing ring after such a penetration has occurred, the medium that has penetrated into the sealing rings abruptly expands. As a consequence of this expansion, the sealing rings are damaged or even destroyed. This kind of event is called an "explosive decompression." In order to reduce the risk of an explosive decompression occurring, it is known to use O-rings having a reduced cross-section and, as a result, a reduced exposed surface area. The likelihood of explosive decompression is also decreased by using O-rings made of materials having very high permeability rates, such as costly silicone materials.

An object of the present invention is to provide sliding ring seals having sealing rings that need not be manufactured of such costly materials, but yet achieve at least the same degree of resistance to explosive decompression as the above-mentioned sealing rings, regardless of the material that constitutes the sealing rings of the present invention.

SUMMARY OF THE INVENTION

In order to achieve this object, a sliding ring seal is provided in which the entire surface area of at least one of the sealing rings is contacted, under an elastic preload, by the delimiting walls of the respective installation space and by a support surface of at least one support element arranged in the installation space. Because almost the entire sealing ring, which is made of an incompressible material, is exposed to a uniform compressive preload, any media that are present in the sealing ring will not be subject to explosive decompression, even if the pressure in the surroundings of the sealing ring drops rapidly. When a rapid pressure drop occurs in the surroundings of the sealing ring, the portion of the medium that has penetrated into the sealing ring only expands slowly, and it escapes gradually from the sealing ring until the pressure in the surroundings of the sealing ring and the pressure inside the sealing ring itself have equalized.

The compressive preload that acts on the sealing ring is applied, under all operating conditions, on all sides in the installation space. As a consequence of this even application of the compressive preload, the destruction of the sealing ring by an explosive decompression is prevented. The medium that has penetrated the sealing ring escapes via the mating surfaces of the support element in the installation space. The delimiting walls of the installation space and the support surface of the support element constitute a chamber for the sealing ring; contact over the surface area of the support ring is incomplete only because the support element must be able to move back and forth inside the installation space. Only very small regions of the surface are not contacted for design reasons.

The support element can be braced by means of a spring in the installation space, the spring preferably being configured as a helical compression spring. The preload on the sealing ring can easily be adapted to the particular conditions of the application by using appropriate springs. Helical compression springs made of a corrosion-free metal material are economically available in a number of dimensions, so that the sliding ring seal claimed herein can, as a whole, be manufactured at low cost in economic terms. The spring has a dual function. The spring affects the elastic preload inside the sealing ring in order to prevent the destruction of the sealing ring by the occurrence of an explosive decompression. The spring also at the same time resiliently braces the sliding ring and the housing in the axial direction, thus ensuring that the sealing surfaces of the counter ring and the sliding ring press in an axial and elastic fashion against one another.

The support element is preferably produced separately. The support element comprises a semi-hard material. The installation spaces respectively constituted by the counter ring and adjusting ring and by the sliding ring and housing are preferably configured in the form of grooves. One of the delimiting walls of the grooves is constituted by a side surface of the support element that faces the sealing ring. The side surface has a congruently configured surface shape adapted to the configuration of the sealing ring.

The sealing rings are preferably configured as incompressible O-rings, and have a Shore A hardness between 50 and 90. The counter ring and the sliding ring are preferably made of a wear-resistant sintered material in order to minimize operationally related abrasive wear in the region of the sealing surfaces.

BRIEF DESCRIPTION OF THE DRAWING

For a more complete understanding of this invention, reference should now be made to the embodiment illustrated in the accompanying drawing and described below.

In the drawings.

DETAILED DESCRIPTION

Figure 1:
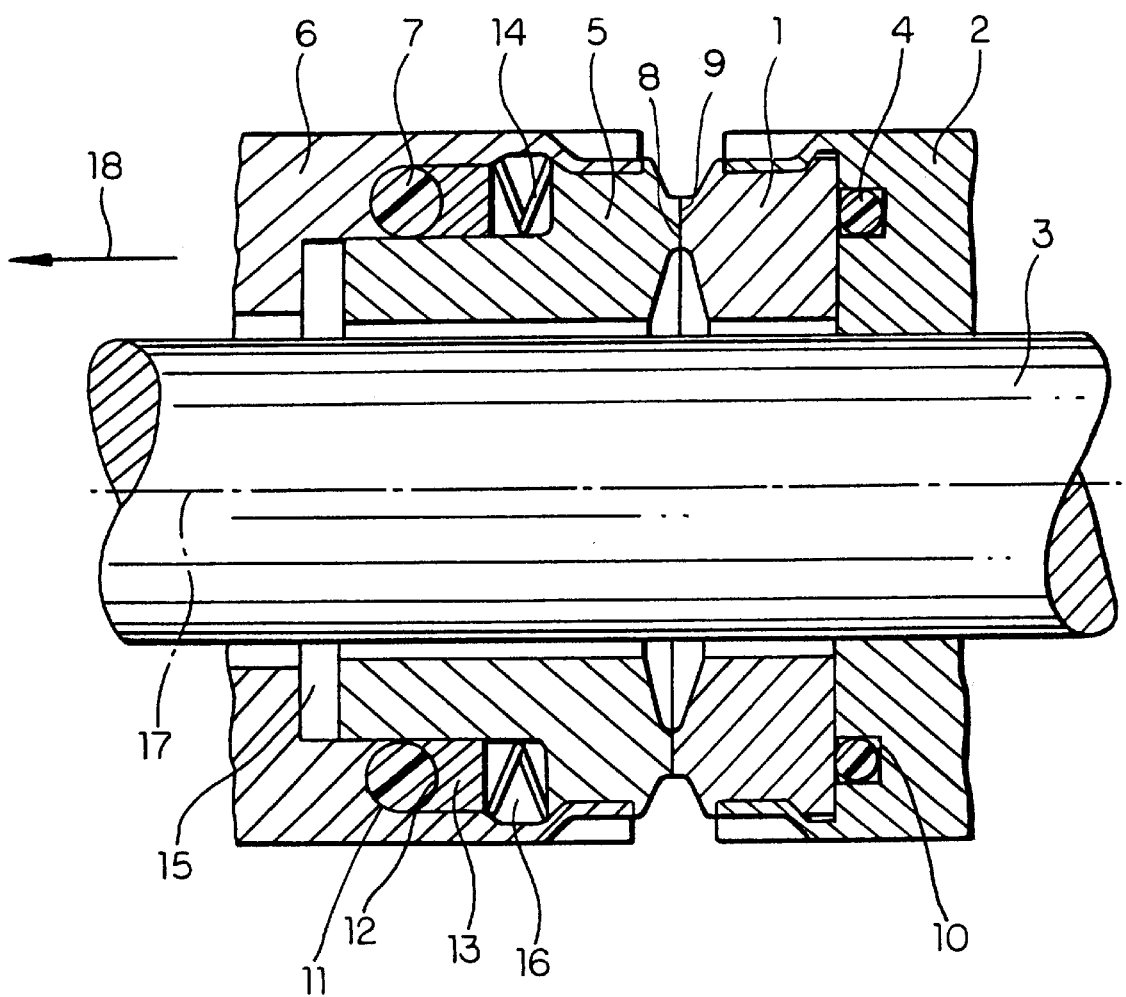
FIG. 1 is a cross-sectional view of an embodiment of a sliding ring seal constructed according to the principles of the invention.

The sliding ring seal shown in FIG. 1 comprises a counter ring 1 and a sliding ring 5, which rest resiliently and sealingly against one another in the region of their sealing surfaces 8 and 9 under an axial preload. A circumferentially oriented relative movement takes place between sealing surfaces 8, 9. In this embodiment, counter ring 1 is joined nonrotatably to adjusting ring 2, which is configured as a buttress. Adjusting ring 2 is joined to shaft 3 in a manner that does not allow for relative rotation therewith. During utilization of the sliding ring seal shaft 3, adjusting ring 2, and counter ring 1 rotate together about rotation axis 17.

Sliding ring 5 is joined to housing 6 in a manner that precludes relative rotation therebetween, but which nevertheless also provides an axially resilient connection.

The two spaces to be sealed off from one another are labeled in the drawing with the reference symbols 15 and 16.

Figure 2:
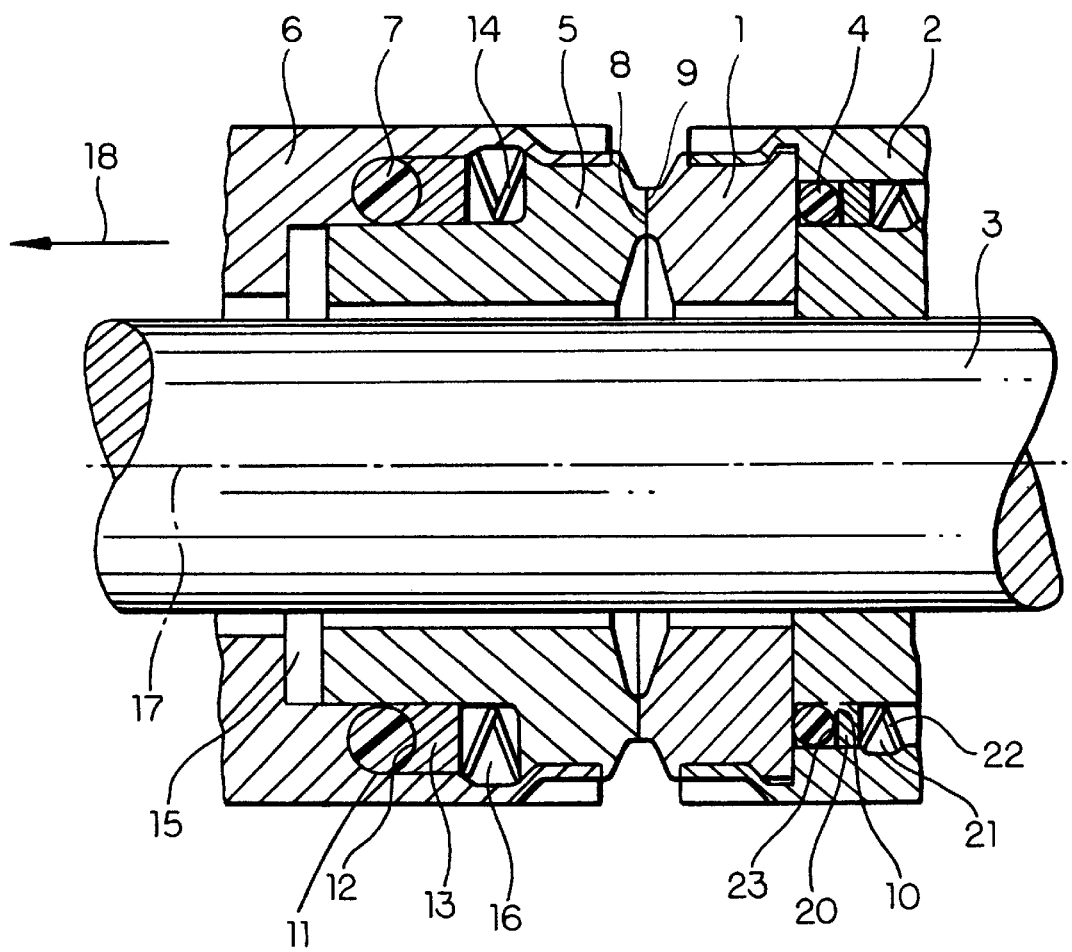
FIG. 2 is a cross-sectional view of another embodiment of a sliding ring seal constructed according to the principles of the invention.

The two sealing rings 4, 7 are each made of elastomeric material. Sealing ring 7 may be made from, for example, an economical butyl material. Sealing rings 4, 7 are preferably configured to have a Shore A hardness between 50 and 90. The gas permeability rate of this kind of material is very low. The operation of the sliding ring seal is as follows. During the operation of the sliding ring seal of the present invention, the medium surrounding the seal is compressed to a predetermined pressure. In the event of a rapid pressure drop in one of spaces 15, 16, the compressed medium will have a tendency to migrate into the other one of spaces 15, 16. As a result, an explosive decompression of the enclosed medium and consequent destruction of sealing ring 7 could occur. In order to prevent the occurrence of such an explosive decompression, the sealing ring 7 is arranged in installation space 11 under an elastic compressive preload. In order to achieve this elastic compressive preload, a spring 14 and a support element 13 are installed along with sealing ring 7 in installation space 11. Spring 14 may be configured as a helical compression spring formed from a corrosion-free metal material. The support element 13 includes a support surface 12. These elements are arranged in installation space 11 so that the entire surface area of the delimiting wall of installation space 11 and the entire surface area of support surface 12 are in contact with sealing ring 7. Spring 14 braces sliding ring 5 resiliently in the axial direction between housing 6 and against counter ring 1; spring 14 also presses the support surface 12 of support element 13 against the surface of sealing ring 7. In installation space 10, the sealing ring 4 may also be arranged under an elastic compressive preload. In this arrangement, which is illustrated in FIG. 2, substantially the entire surface area of the delimiting wall of installation space 10 and of a support surface 23 of another support element 20 would be in contact with sealing ring 4. A spring 22 that is provided in space 21 provides the elastic compressive preload by pressing the support surface 23 of support element 20 against sealing ring 4 in installation space 10. Spring 22 also braces counter ring 1 resiliently in the axial direction between adjusting ring 2 and against sliding ring 5.

Because support element 13 contacts sealing ring 7 under a preload condition, only a slow, gradual pressure diminution will occur within sealing ring 7 in the event of a rapid pressure drop in one of spaces 15, 16. Thus, the configuration of the present sliding seal prevents the destruction of sealing ring 7 when such a pressure drop occurs. The direction of the force exerted by spring 14 on support element 13 is shown by arrow 18.

In order to improve the operation of the sliding ring seal over a long service life, sliding ring 5 and counter ring 1 are each made of a sintered material.

What is claimed is:

1. A sliding ring seal, comprising:
   a counter ring having a sealing surface;
   an adjusting ring interconnected with the counter ring in a non-rotatable manner, wherein at least one of the counter ring and the adjusting ring is configured as a buttress;
   a shaft enclosed by the counter ring and connected to the adjusting ring in a non-rotatable manner;
   at least a first sealing ring for sealing the counter ring with respect to the adjusting ring and for sealing the shaft with respect to the counter ring and with respect to the adjusting ring, wherein the at least first sealing ring comprises an elastomeric material, wherein the at least first sealing ring contacts a sealing surface of the counter ring, and wherein the at least first sealing ring is arranged under an elastic preload;
   a housing;
   a sliding ring coupled resiliently in an axial direction and in a non-rotatable manner to the housing; and
   at least a second sealing ring for sealing the sliding ring and the housing, wherein the at least first sealing ring is arranged sealingly under the elastic preload in a first installation space formed between the counter ring and the adjusting ring, wherein the at least second sealing ring is arranged sealingly under the elastic preload in a second installation space formed between the sliding ring and the housing, and wherein substantially an entire surface of at least one of the at least first sealing ring and the at least second sealing ring is in contact with, under the elastic preload, a plurality of delimiting walls of a corresponding one of the first installation space and the second installation space and with a support surface of at least one support element arranged in the corresponding one of the first installation space and the second installation space.

2. A sliding ring seal as set forth in claim 1, wherein the at least one support element is braced by a spring in the installation space.

3. A sliding ring seal as set forth in claim 2, wherein the spring comprises a helical compression spring.

4. A sliding ring seal as set forth in claim 3, wherein the at least one support element includes, on the side facing toward at least one of the at least first sealing ring and the at least second sealing ring, a congruently configured surface shape adapted to the configuration of at least one of the at least first sealing ring and the at least second sealing ring.

5. A sliding ring seal as set forth in claim 4, wherein the plurality of delimiting walls includes, on the side facing toward at least one of the at least first sealing ring and the at least second sealing ring, a congruently configured surface shape adapted to the configuration of at least one of the at least first sealing ring and the at least second sealing ring.

6. A sliding ring seal as set forth in claim 2, wherein the at least one support element includes, on the side facing toward at least one of the at least first sealing ring and the at least second sealing ring, a congruently configured surface shape adapted to the configuration of at least one of the at least firs sealing ring and the at least second sealing ring.

7. A sliding ring seal as set forth in claim 6, wherein the plurality of delimiting walls includes, on the side facing toward at least one of the at least first sealing ring and the at least second sealing ring, a congruently configured surface shape adapted to the configuration of at least one of the at least first sealing ring and the at least second sealing ring.

8. A sliding ring seal as set forth in claim 1, wherein at least one support element includes, on the side facing toward at least one of the at least first sealing ring and the at least second sealing ring, a congruently configured surface shape adapted to the configuration of at least one of the at least first sealing ring and the at least second sealing ring.

9. A sliding ring seal as set forth in claim 8, wherein the plurality of delimiting walls includes, on the side facing toward at least one of the at least first sealing ring and the at least second sealing ring, a congruently configured surface shape adapted to the configuration of at least one of the at least first sealing ring and the at least second sealing ring.

10. A sliding ring seal comprising:

a counter ring;

an adjusting ring coupled to the counter ring;

a shaft enclosed by the counter ring and the adjusting ring;

a first sealing ring engaged in a first sealing contact with the counter ring and the adjusting ring;

a housing;

a sliding ring axially aligned with and coupled to the housing;

a second sealing ring engaged in a second sealing contact with the housing and the sliding ring, wherein the first sealing ring is arranged in a first installation space and the second sealing ring is arranged in a second installation space, wherein substantially an entire surface area of at least one of the first sealing ring and the second sealing ring is contacted under an elastic preload by delimiting walls of a corresponding one of the first installation space and the second installation space and by a support surface of at least one support element arranged in the corresponding one of the first installation space and the second installation space.

11. A sliding ring seal as set forth in claim 10, wherein the adjusting ring and the counter ring are interconnected in a non-rotatable manner.

12. A sliding ring seal as set forth in claim 10, wherein the shaft is enclosed by the counter ring and the adjusting ring in a non-rotatable manner.

13. A sliding ring seal as set forth in claim 10, wherein at least one of the first sealing and the second sealing ring comprises an elastomeric material.

14. A sliding ring seal as set forth in claim 13, wherein the elastomeric material comprises a butyl material.

15. A sliding ring seal as set forth in claim 10, wherein the at least one support element comprises a helical spring.

16. A sliding ring seal as set forth in claim 15 wherein the helical spring comprises a corrosion-free metal material.

17. A sliding ring seal as set forth in claim 10, wherein the at least one support element includes, on the side facing toward at least one of the first sealing ring and the second sealing ring, a congruently configured surface shape adapted to the configuration of at least one of the first sealing ring and the second sealing ring.

18. A sliding ring seal as set forth in claim 17, wherein the delimiting walls include, on the side facing toward at least one of the at least first sealing ring and the at least second sealing ring, a congruently configured surface shape adapted to the configuration of at least one of the at least first sealing ring and the at least second sealing ring.

19. A sliding ring seal as set forth in claim 10, wherein at least one of the first sealing ring and the second sealing ring is configured as an incompressible O-ring having a Shore A hardness between a range of 50 and 90.

20. A sliding ring seal as set forth in claim 10, wherein at least one of the counter ring and the sliding ring comprises a wear-resistant sintered material.

21. A sliding ring seal comprising:

a counter ring;

an adjusting ring coupled to the counter ring;

a shaft enclosed by the counter ring and the adjusting ring;

a first sealing ring providing a seal between the counter ring and the sealing ring;

a housing;

a sliding ring axially aligned with and coupled to the housing so as to define an axially extending annular gap between the housing and the sliding ring, said annular gap having a first axial end and a second axial end;

a second sealing ring abutting the first axial end of the annular gap and pressed thereagainst by a support element located within the annular gap, said second sealing ring permitting a pressure differential; and a spring element located within the annular gap, said spring element having two ends, one of which urges the support element against the second sealing ring and thereby presses the second sealing ring against the housing, and the other end of the second sealing ring being buttressed against an abutment located on the sliding ring;

wherein the spring provides a level of compressive preloading of the second sealing ring so that in the event of sudden loss of decompression across the seal, the second sealing ring will not undergo explosive decompression.

* * * * *